US008564884B2

(12) United States Patent
Hirsa et al.

(10) Patent No.: US 8,564,884 B2
(45) Date of Patent: Oct. 22, 2013

(54) RECONFIGURABLE, NON-OSCILLATING LIQUID LENS AND IMAGING SYSTEMS

(75) Inventors: Amir H. Hirsa, Clifton Park, NY (US); Bernard A. Malouin, Jr., Troy, NY (US); Michael J. Vogel, Voorhees, NJ (US)

(73) Assignee: Rensselaer Polytechnic Institute, Troy, NY (US)

( * ) Notice: Subject to any disclaimer, the term of this patent is extended or adjusted under 35 U.S.C. 154(b) by 288 days.

(21) Appl. No.: 13/191,004

(22) Filed: Jul. 26, 2011

(65) Prior Publication Data

US 2012/0026599 A1    Feb. 2, 2012

Related U.S. Application Data

(60) Provisional application No. 61/368,020, filed on Jul. 27, 2010.

(51) Int. Cl.
*G02B 1/06* (2006.01)
*G02B 15/14* (2006.01)

(52) U.S. Cl.
USPC .......................................... 359/665; 359/676

(58) Field of Classification Search
USPC ................................................ 359/665–667
See application file for complete search history.

(56) References Cited

U.S. PATENT DOCUMENTS

| | | | |
|---|---|---|---|
| 5,952,651 A | 9/1999 | Morito et al. | |
| 6,328,421 B1 | 12/2001 | Kojima et al. | |
| 7,369,321 B1 | 5/2008 | Ren et al. | |
| 7,545,430 B2 | 6/2009 | Nakagawa | |
| 2006/0092519 A1 | 5/2006 | Hasei | |
| 2006/0166411 A1 | 7/2006 | Morisue et al. | |
| 2007/0127120 A1 | 6/2007 | Onuki et al. | |
| 2009/0316003 A1* | 12/2009 | Hirsa et al. | 348/187 |
| 2010/0232028 A1* | 9/2010 | Takai | 359/626 |
| 2011/0122504 A1* | 5/2011 | Rodríguez Fernández et al. | 359/666 |
| 2012/0027247 A1* | 2/2012 | Hirsa et al. | 382/100 |

OTHER PUBLICATIONS

International Search Report & Written Opinion of PCT/US2011/045346 (PCT Publication No. WO 2012/015811 A1), dated Mar. 9, 2012.
International Search Report & Written Opinion of PCT/US2011/045353 (PCT Publication No. WO 2012/015813 A1), dated Mar. 21, 2012.
Hirsa et al., Notice of Allowance for U.S. Appl. No. 12/487,328, filed Jun. 18, 2009 (U.S. Patent Publication No. 2009/0316003), dated Feb. 16, 2012.

* cited by examiner

*Primary Examiner* — Jordan Schwartz
(74) *Attorney, Agent, or Firm* — Kevin P. Radigan, Esq.; Heslin Rothenberg Farley & Mesiti P.C.

(57) ABSTRACT

A non-oscillating liquid lens and imaging system and method employing the lens are provided. The liquid lens includes a substrate with a channel opening extending through the substrate. A liquid lens drop is held within the channel and is sized with a first droplet portion, including a first capillary surface, protruding away from a first substrate surface, and a second droplet portion, including a second capillary surface, protruding away from a second substrate surface. The liquid lens further includes an enclosure at least partially surrounding the substrate, and which includes a chamber. The liquid lens drop resides within the chamber, and the liquid lens includes a second liquid disposed within the chamber in direct or indirect contact with the liquid lens drop, and an actuator which facilitates adjusting configuration of the liquid lens drop within the channel, and thus, a focal distance of the liquid lens.

24 Claims, 10 Drawing Sheets

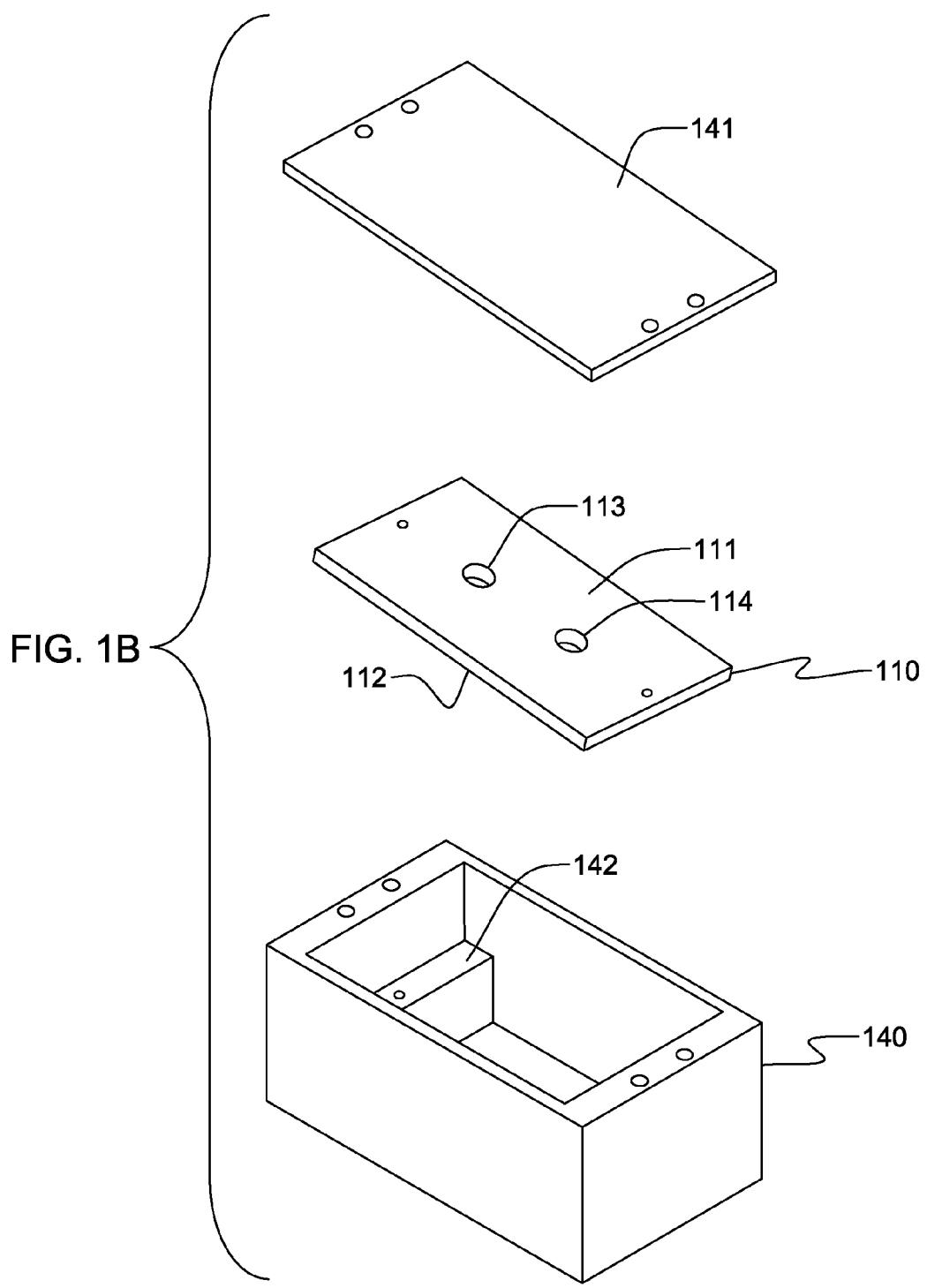

RECONFIGURABLE, NON-OSCILLATING LIQUID LENS AND IMAGING SYSTEMS

CROSS-REFERENCE TO RELATED APPLICATION

This application claims the benefit of U.S. Provisional Patent Application No. 61/368,020, filed Jul. 27, 2010, which is hereby incorporated herein by reference in its entirety.

STATEMENT REGARDING FEDERALLY SPONSORED RESEARCH

This invention was made with support from the Defense Advanced Research Projects Agency (DARPA) of the Department of Defense of the United States of America, under Contract No. HR001-09-1-0052. Accordingly, the United States government may have certain rights in the invention.

BACKGROUND

The present invention relates in general to adaptive optical devices, and more particularly, to liquid lenses, and to imaging systems and imaging methods employing the same.

Optical focusing is often a slow process due to the delay inherent in moving mechanically a camera's lens until an image is in focus. Although liquids are considered an exotic choice for lens material, there is interest in liquid lenses for applications in adaptive optics requiring fast response, or for applications that require small or cost effective optics. Liquid lenses advantageously avoid the increased weight and fabrication complexity associated with moving solid lenses. The interface of a liquid lens has good optical qualities because of surface tension, which dominates gravity in the sub-milliliter scale, and provides interfaces that are nearly perfectly spherical and optically smooth.

The recent surge in the use of images and multimedia in consumer-level wireless communications has fueled the pursuit of lightweight and robust adaptive optics. The desire for such lenses extends beyond cell phones and camcorders, however, to advanced technologies in biomedical sensing and imaging, autonomous air and underwater vehicles for surveillance and defense, microscopy and adaptive lithography for micro-manufacturing, etc.

BRIEF SUMMARY

The shortcomings of the prior art are overcome and additional advantages are provided through the provision, in one aspect, of a non-oscillating liquid lens. The non-oscillating liquid lens includes a substrate comprising at least one channel extending through the substrate between a first surface and a second surface of the substrate, and a liquid lens drop comprising a first liquid. The liquid lens drop is held at least partially within one channel of the at least one channel extending through the substrate, and includes a first droplet portion with a first capillary surface protruding away from the first surface of the substrate, and a second droplet portion with a second capillary surface protruding away from the second surface of the substrate. The first droplet portion and the second droplet portion are connected through the one channel. The liquid lens further includes an enclosure which at least partially surrounds the substrate, and which includes a chamber. The one channel of the at least one channel extending through the substrate resides within the chamber of the enclosure. A second liquid is disposed within the chamber, and the second liquid and the liquid lens drop comprising the first liquid are in either direct or indirect contact within the chamber. The liquid lens further includes an actuator which facilitates adjusting configuration of the liquid lens drop within the one channel within the chamber, wherein adjusting configuration of the liquid lens drop adjusts a focal distance of the liquid lens.

In another aspect, an imaging system is provided which includes a non-oscillating liquid lens and at least one image sensor. The non-oscillating liquid lens includes a substrate comprising at least one channel extending through the substrate between a first surface and a second surface of the substrate, and a liquid lens drop comprising a first liquid. The liquid lens drop is at least partially held within one channel of the at least one channel extending through the substrate, and includes a first droplet portion with a first capillary surface protruding away from the first surface of the substrate, and a second droplet portion with a second capillary surface protruding away from the second surface of the substrate. The first droplet portion and the second droplet portion are connected through the one channel. The liquid lens further includes an enclosure, which at least partially surrounds the substrate, and includes a chamber, wherein the one channel of the at least one channel extending through the substrate resides within the chamber of the enclosure. A second liquid is disposed within the chamber, and the second liquid and the liquid lens drop comprising the first liquid are in either direct or indirect contact within the chamber. An actuator is provided which facilitates adjusting configuration of the liquid lens drop held within the one channel within the chamber, wherein adjusting configuration of the liquid lens drop adjusts a focal distance of the liquid lens. The at least one imaging sensor is coupled to at least one imaging path passing through the first and second droplet portions of the liquid lens drop held at least partially in the one channel for capturing an image through the first and second droplet portions of the liquid lens drop.

In yet another aspect, an imaging method is provided which includes: adjusting configuration of a liquid lens drop of a non-oscillating liquid lens, the non-oscillating liquid lens comprising a substrate defining a channel extending between a first surface and a second surface thereof, with the liquid lens drop being at least partially held within the channel, the liquid lens drop comprising a first droplet portion including a first capillary surface protruding away from the first surface of the substrate and a second droplet portion comprising a second capillary surface protruding away from the second surface of the substrate, wherein the first and second droplet portions of the liquid lens drop are connected through the channel, the liquid lens further including an enclosure at least partially surrounding the substrate and comprising a chamber, the channel residing within the chamber and the chamber comprising a second liquid, the second liquid and the liquid lens drop comprising the first liquid being in direct or indirect contact within the chamber, and wherein the adjusting comprises applying a force to at least one of the first droplet portion or the second droplet portion to reconfigure the liquid lens drop within the channel, and thereby adjust a focal distance of the liquid lens; and capturing at least one image via an image path passing through at least one of the first or second droplet portions of the liquid lens drop.

In a further aspect, a method of fabricating a liquid lens is provided which includes: obtaining a substrate which is non-wetting relative to a liquid lens drop; providing at least one channel in the substrate extending from a first surface to a second surface thereof; providing the liquid lens drop, comprising a first liquid, at least partially held within one channel of the at least one channel extending through the substrate, the liquid lens drop comprising a first droplet portion with a first capillary surface protruding away from the first surface of the substrate and a second droplet portion with a second capillary surface protruding away from the second surface of the substrate, the first droplet portion and the second droplet portion being connected through the one channel; providing an enclosure comprising a chamber enclosing the one channel extending through the substrate, the first surface of the substrate facilitating defining a first chamber portion of the chamber, and the second surface of the substrate facilitating defining a second chamber portion of the chamber; disposing a second liquid within the first chamber portion and the second chamber portion of the chamber, the second liquid and the liquid lens drop being either in direct or indirect contact within the chamber; and providing an actuator operatively coupled to at least one of the first droplet portion or the second droplet portion of the liquid lens drop for adjusting configuration of the liquid lens drop, wherein adjusting configuration of the liquid lens drop adjusts a focal distance of the liquid lens.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 1B is a partially exploded isometric view of the liquid lens structure of FIG. 1A, illustrating assembly thereof, in accordance with one or more aspects of the present invention;

DETAILED DESCRIPTION

Figure 1A:
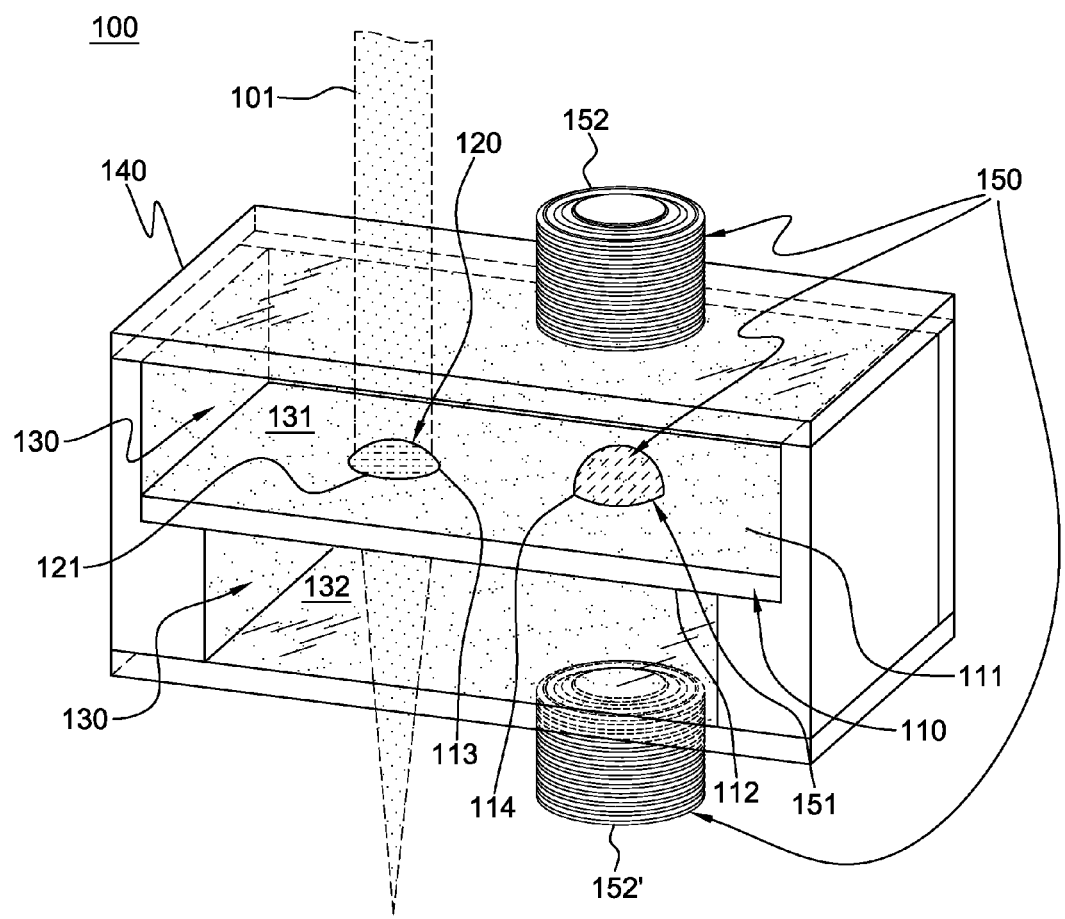
FIG. 1A is a cross-sectional illustration of one embodiment of a liquid lens structure, in accordance with one or more aspects of the present invention.

Disclosed herein is a reconfigurable, non-oscillating liquid lens with an actuator (or driver) for adjusting configuration of a liquid lens drop, and thus a focal distance of the reconfigurable, non-oscillating liquid lens. The reconfigurable, non-oscillating liquid lens is stable (or static) once configured, and is ideal for lower-power applications and those requiring long exposure time, such as low-light imaging. As explained further below, in certain embodiments, once a new lens configuration is achieved (i.e., a desired focal distance is obtained), no further energy or power input is needed to maintain or hold that liquid lens configuration.

While certain strategies have used membranes to contain a liquid lens, of particular interest is a liquid lens constrained only by the surface tension itself, primarily due to the deleterious effects of the membrane on image quality and the manufacturing challenges in producing a uniform and long-lasting membrane. However, even surface-tension-bound strategies have been awkward in practice, with gravity limiting apertures to a few millimeters and evaporation preventing stable operation beyond a few minutes.

Addressing these issues, disclosed herein are liquid-liquid lens structures and imaging systems and methods employing the same, which mitigate the shortcomings of previous liquid lenses by achieving stable centimeter-scale apertures, orientation independence, and long-term stability. The liquid-liquid lens is formed by coupling two droplets of a first, high-index of refraction liquid through a first channel (for example, a circular hole) in a substrate, such as a plate, and providing a second liquid with low-index of refraction, such as water, surrounding the plate and liquid lens, with the lens system being enclosed by an enclosure (such as a transparent acrylic box). Note, in one example, the ratio of index of refraction of the lens drop (e.g., 1-methylnaphthalene, with index of refraction of 1.615) and index of refraction of the surrounding liquid (e.g., water, with index of refraction of 1.33) is 1.214, which is significantly larger than unity and approaches that of air/water lens with ratio of indices of refraction of 1.33. The first liquid and the second liquid are chosen to be immiscible. By matching density of the first liquid droplets ($\rho_D$) with that of the surrounding liquid, such as water ($\rho_W$), the capillary length (scales with $(\rho_D - \rho_W)^{-1/2}$) can be increased from millimeters (for a typical liquid in gas liquid lens, such as a water lens in air) to centimeters.

To effect change in the curvature of the droplet (to achieve a focal distance change) it is desirable to actuate the enclosed lens system in a non-invasive manner. To this end, an actuator is provided comprising, in one embodiment, one or more second channels (or openings) in the substrate, each of which accommodates and holds a ferrofluid drop comprising two coupled ferrofluid droplets. With one or more relatively small electromagnetic drivers placed (for example) outside of the enclosure, the ferrofluid drop(s) can be reconfigured, which in turn results in reconfiguration of the liquid lens drop as the ferrofluid droplets reconfigure (i.e., displace liquid) within the fixed volumes of first and second chamber portions on either side of the substrate filled with the incompressible second liquid.

In one embodiment described herein, two electromagnets are aligned, one above and one below the at least one ferrofluid drop, to facilitate reconfiguration and holding of the at least one ferrofluid drop in, for example, an asymmetrical configuration, and thus, reconfiguring and maintaining stable (or static) the liquid lens drop. In another embodiment described herein, multiple ferrofluid drops may be held in multiple second channels (or openings) in the substrate. Each ferrofluid drop of the multiple ferrofluid drops is sized adequately large for its channel (or opening) so as to function as a bi-stable capillary switching element, which allows the non-oscillating liquid lens to be controllably reconfigured, for example, by applying a DC pulse to one or more electromagnet drivers associated with the multiple ferrofluid drops to transition the state of one or more of the bi-stable ferrofluid switching elements.

Reference is made below to the drawings, which are not drawn to scale and which are simplified for ease of understanding, wherein the same reference numbers used throughout different figures designate the same or similar components.

FIG. 1A illustrates one embodiment of a liquid lens structure, generally denoted 100, in accordance with one or more aspects of the present invention. Liquid lens structure 100, which is alternatively referred to herein as a liquid-liquid lens structure or a non-oscillating liquid lens structure, includes a substrate 110 having opposite first and second main surfaces 111, 112, respectively. Substrate 110 is non-wetting in relation to the lens and driver liquids, in the presence of a surrounding liquid such as water, and comprises, in one example, a hydrophilic material, such as anodized aluminum. The substrate 110 may itself be formed of such a non-wetting material, or be coated with the non-wetting material, including within the one or more channels (or openings) described herein. In the depicted example, substrate 110 includes a first channel 113 and a second channel 114 extending therethrough between first main surface 111 and second surface 112. These first and second channels 113, 114 are depicted by way of example only. In other implementations, an array of multiple channels may be provided for either the liquid lens portion or the actuation portion of the liquid-liquid lens system described herein. For example, in other implementations, multiple channels may be provided for either or both the liquid lens portion or the actuation portion of the structure, each with a common transverse cross-sectional area (e.g., a common diameter), or with different transverse cross-sectional areas (e.g., different diameters), as desired. By providing channels with different cross-sectional areas, or different amounts of liquid protruding from channels of the same cross-sectional area, an array of coupled droplets may achieve different focusing characteristics or different switch characteristics.

Within first channel 113 of substrate 110, a liquid lens drop 120 is held. By way of example, each channel to accommodate a liquid lens drop (to function as the lens portion of the liquid lens system) may comprise a cylindrical-shaped hole (or bore) through the substrate, with each liquid drop being, for example, a drop of transparent liquid, such as silicone oil. (Those skilled in the art will note that other liquids may alternatively be employed as the liquid lens.) Because substrate 110 is non-wetting, the liquid lens drop 120 does not spread on the substrate, and the liquid-liquid-solid contact line between liquid lens drop 120, a second liquid 130 (e.g., water) within a chamber defined by an enclosure 140 (described below) and substrate 110 is pinned at the edge 121 of first channel 113. Liquid lens drop 120 may be characterized as including a first droplet portion 201 (see FIGS. 2A & 2B) comprising a first capillary surface which protrudes away from first surface 111 of substrate 110, and a second droplet portion 202 (FIGS. 2A & 2B) comprising a second capillary surface which protrudes away from second surface 112 of substrate 110. In this embodiment, the liquid lens drop and the second liquid are in direct contact and are immiscible, with the first and second capillary surfaces of liquid drop 120 being liquid-to-liquid interface surfaces of the liquid-liquid lens disclosed herein, which as noted above, are nearly perfect, spherical shapes, due to surface tension. The first and second droplet portions 201, 202 (FIGS. 2A & 2B) of liquid drop 120 are directly connected (i.e., interconnected) through a liquid body portion of liquid lens drop 120 held within first channel 113 of substrate 110.

The illustrated liquid lens structure 100 of FIG. 1A further includes enclosure 140, second liquid 130 disposed within a chamber defined by enclosure 140, and an actuator (or driver) 150. In one embodiment, the chamber comprises a first chamber portion 131 and a second chamber portion 132, each of which is substantially filled with second liquid 130. Also, in one embodiment, enclosure 140 includes a bottom wall, two front and back walls, two side walls, and a top (or lid), which may be removable to allow access to the interior of the enclosure, as depicted in FIG. 1B. By way of further example, enclosure 140 may be a transparent housing, with the side walls thereof being configured with a ledge 142 (FIG. 1B) to support and hold the substrate within the enclosure.

In one embodiment, actuator 150 is controllable to non-invasively, indirectly reconfigure liquid lens drop 120 within first channel 113. As one example, actuator 150 may comprise one or more ferrofluid drops 151 disposed within one or more second channels 114 extending between first main surface 111 and second main surface 112 of substrate 110, with one ferrofluid drop 151 disposed in one second channel 114 being illustrated in FIG. 1A. Actuator 150 further includes, in the illustrated embodiment, two electromagnetic drivers 152, 152' aligned above and below ferrofluid drop 151. Ferrofluid drop 151 may be characterized as including a first droplet portion 210 (see FIGS. 2A & 2B) comprising a first capillary surface which protrudes away from first surface 111 of substrate 110, and a second droplet portion 211 (see FIGS. 2A & 2B) comprising a second capillary surface which protrudes away from second surface 112 of substrate 110. First and second capillary surfaces of ferrofluid drop 151 are liquid-liquid interface surfaces in the reconfigurable liquid lens structure disclosed, and the first and second droplet portions 210, 211 are directly connected (i.e., interconnected) through a liquid body portion of ferrofluid drop 151 disposed within second channel 114 of substrate 110.

Electromagnetic drivers 152, 152', such as DC-controlled electromagnets with an iron core, produce (when activated) a steady magnetic field, which operates to move or control ferrofluid drop 151, and consequently (via incompressible second liquid 130), liquid lens drop 120.

Figure 2A:
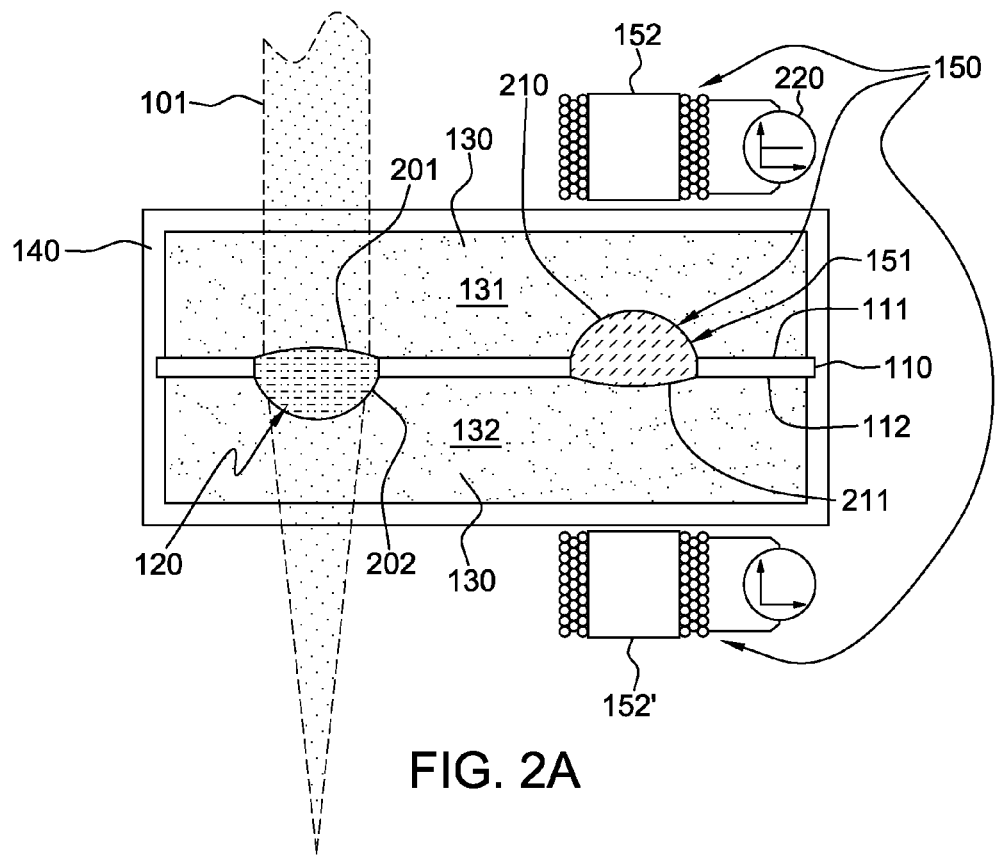
FIGS. 2A & 2B depict reconfiguration of the liquid lens drop of the liquid lens structure of FIG. 1A, responsive to an actuator, wherein a second droplet portion (of the liquid lens drop) with a second capillary surface protruding away from a second surface of the substrate is illustrated enlarged in FIG. 2A, and a first droplet portion (of the liquid lens drop) with a first capillary surface protruding away from a first surface of the substrate is illustrated enlarged in FIG. 2B, in accordance with one or more aspects of the present invention.

Those skilled in the art will note from the description provided herein that the shape of liquid lens drop 120, and in particular, the upper and lower interfaces of the liquid drop, will be altered responsive to adjustments to ferrofluid drop 151 (through the incompressible motion of the surrounding second liquid 130), thus allowing for the reconfiguration of the liquid lens to change the focus of incident light 101. The electromagnets on either side of the ferrofluid drop facilitate controlling the proportion of the ferrofluid droplets on the different sides of the substrate, and in turn, the proportion of the liquid lens droplets on either side of the substrate, that is, the corresponding shape of the liquid lens. By adjusting shape in the liquid lens, the focal distance of the liquid-liquid lens system is adjusted, thus providing an adaptive, non-oscillating liquid lens. In FIG. 2A, when the upper electromagnet is energized, the coupled ferrofluid droplet(s) are drawn towards the energized electromagnet. Note that in this example, the ferrofluid droplets 210, 211 each comprise a volume that is smaller than the critical volume (that is, the spherical volume with a radius equal to that of the radius of the respective second channel through the substrate). In the absence of external forces, the coupled ferrofluid droplets tend to a symmetrical shape and thus, to maintain an asymmetrical shape one or more of electromagnets 152, 152' will need to be energized. With the lower electromagnet 152' energized, the ferrofluid droplet portion 211 (see FIG. 2B) extending into second chamber portion 132 becomes larger (reducing the first droplet portion 210 in first chamber portion 131), which in turn increases the first droplet portion 201 of liquid lens drop 120, making the focal distance smaller. Conversely, with upper electromagnet 152 energized, the ferrofluid droplet portion 210 extending into the first chamber portion 131 becomes larger (reducing the second droplet portion 211 in second chamber portion 132), which in turn reduces the first droplet portion 201 of liquid lens drop 120, making the focal distance longer.

FIG. 1B depicts one embodiment for assembling a liquid lens structure 100, in accordance with one or more aspects of the present invention. Note that this structure and method of fabrication are provided by way of example only. The fabrication process may include:

- Pre-wetting the first and second channels 113, 114 of substrate 110 to ensure that the respective liquids in those channels will wet. To accomplish this, the channels through the substrate may be swabbed with the respective first liquid (in first channel 113) or ferrofluid (in the second channel 114). During this process, the first and second main surfaces 111, 112 of substrate 110 are not contacted with either fluid, since if liquid is swabbed outside of the channels, pinning becomes difficult. The substrate is allowed to dry, leaving a residue of the liquids (only a small amount should be in either channel), which when using oils, will not dry completely.
- Enclosure 140 is then filled with the immiscible second fluid 130 (see FIG. 1A), including over ledges 142 in the two side walls of enclosure 140. Note that filling the entire chamber of the enclosure is acceptable, knowing that the second fluid will overflow as pieces are added to the liquid-liquid lens structure.
- Substrate 110 is then placed within the liquid-filled enclosure, holding the substrate at an angle to ensure that no gas bubbles are trapped under the substrate. The substrate is placed on and secured to flat ledges 142, ensuring that the immiscible, second liquid surrounds the substrate.
- Next, a syringe may be used to begin filling first channel 113 with the first liquid. Start by contacting the syringe tip to the channel and working around the circumference while injecting fluid, until a capillary surface is completely formed across the diameter. After this occurs, the filling procedure can be completed by keeping the syringe tip stationary and injecting the fluid into the column.
- To ensure that each pair of coupled droplets are pinned, the droplets must be over-filled past the end of the channel. If all areas are not pinning, move the syringe tip in a circular motion around the rim of the channel (not adding more of the fluid), and again, not contacting the first main surface or second main surface of substrate 110.
- After pinning has been established for a set of coupled droplets, the volume can be set; for example, by using the measurements on the syringe, or through visual inspection, the volume of each coupled droplet can be set. For visual inspection of the volume, the height (h) of each droplet is found from a profile view, knowing the radius of the channel (a), and using the formulation for a spherical cap, $V=1/6\pi h(a^2+h^2)$, the volume can be determined (for example, accomplished using a camera and LabView).
- The same procedure is followed to establish the ferrofluid drop.
- After both sets of coupled droplets are filled and pinned, the immiscible second fluid is then added so as not to disrupt the two sets of coupled droplets, until overfilled condition (convex meniscus) is reached within the enclosure.
- Finally, the top 141 of enclosure 140 can be secured onto the enclosure, for example, by placing it down onto the enclosure at an angle so as not to introduce gas bubbles to the lens system, and to displace the immiscible second liquid (i.e., surrounding liquid) as it seals out. The top 141 is affixed to the balance of the enclosure to form a fluid-tight, sealed chamber within the enclosure.

Figure 2B:
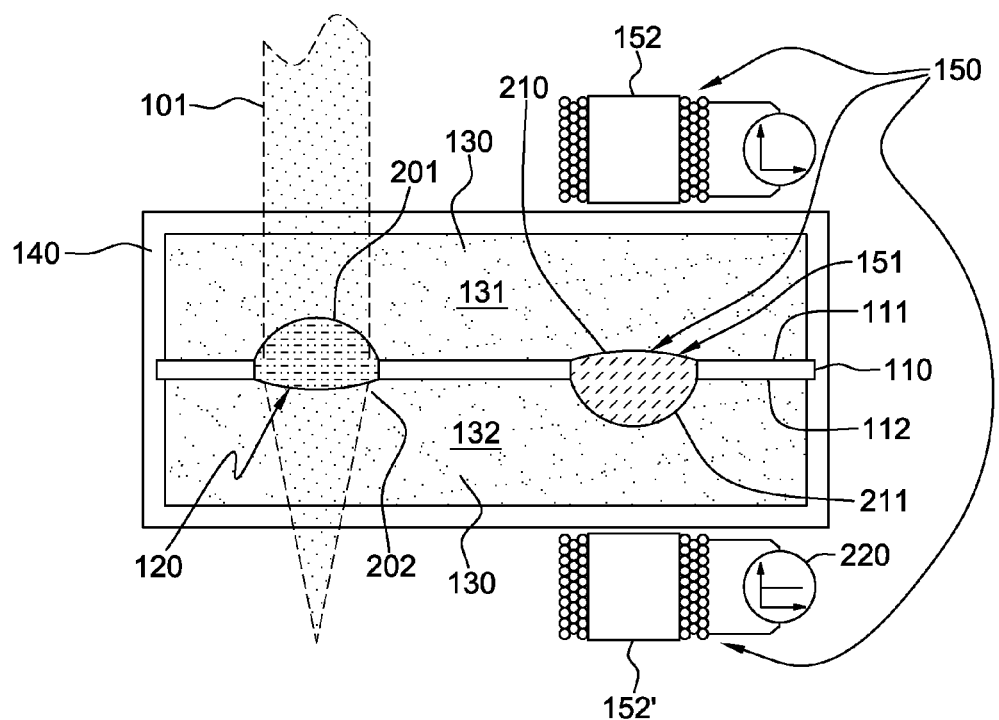

As noted, FIGS. 2A & 2B illustrate operation of a reconfigurable, non-oscillating liquid lens structure 100, in accordance with one or more aspects of the present invention. In operation, when electromagnetic drive 152 is in a magnetizing state (illustrated as a steady, DC signal 220 applied to the electromagnetic drive), first droplet portion 210 of ferrofluid drop 151 has a larger volume within first chamber portion 131 of enclosure 140 (as illustrated in FIG. 2A), and the incompressible second liquid 130 operates to force more of the first liquid in liquid lens drop 120 into second droplet portion 202 extending within second chamber portion 132 of enclosure 140. This produces a longer focal distance for focusing incident light 101. Note that, in this operational state, no voltage is applied to the lower electromagnetic drive 152'. FIG. 2A illustrates, by way of example, a farthest focal distance limit of the liquid lens structure.

A closest focal distance limit of the liquid lens structure is illustrated by the operational example of FIG. 2B, wherein electromagnetic driver 152 is deactivated (by applying no voltage to the electromagnet), and electromagnetic drive 152' is activated to a magnetizing state with an appropriate DC signal 220 to produce an electromagnetic field within the liquid lens structure which moves the ferrofluid drop so that second droplet portion 211 has a larger volume within second chamber portion 132 of enclosure 140 (as illustrated in FIG. 2B). In turn, the incompressible second fluid 130 operates to displace more of first fluid in liquid lens drop 120 into first droplet portion 201 protruding within first chamber portion 131 of enclosure 140, which produces a shorter focal distance for focusing incident light 101. In this manner, liquid lens drop 120 is reconfigured and the focal distance of the lens is varied as the ferrofluid drop is reconfigured, which in turn varies the refraction of the incident light 101 and thus the focal distance, providing an adaptive capability to the non-oscillating liquid lens.

The reconfigurable liquid lens structure disclosed herein may be incorporated and employed within various imaging systems.

Figure 3:
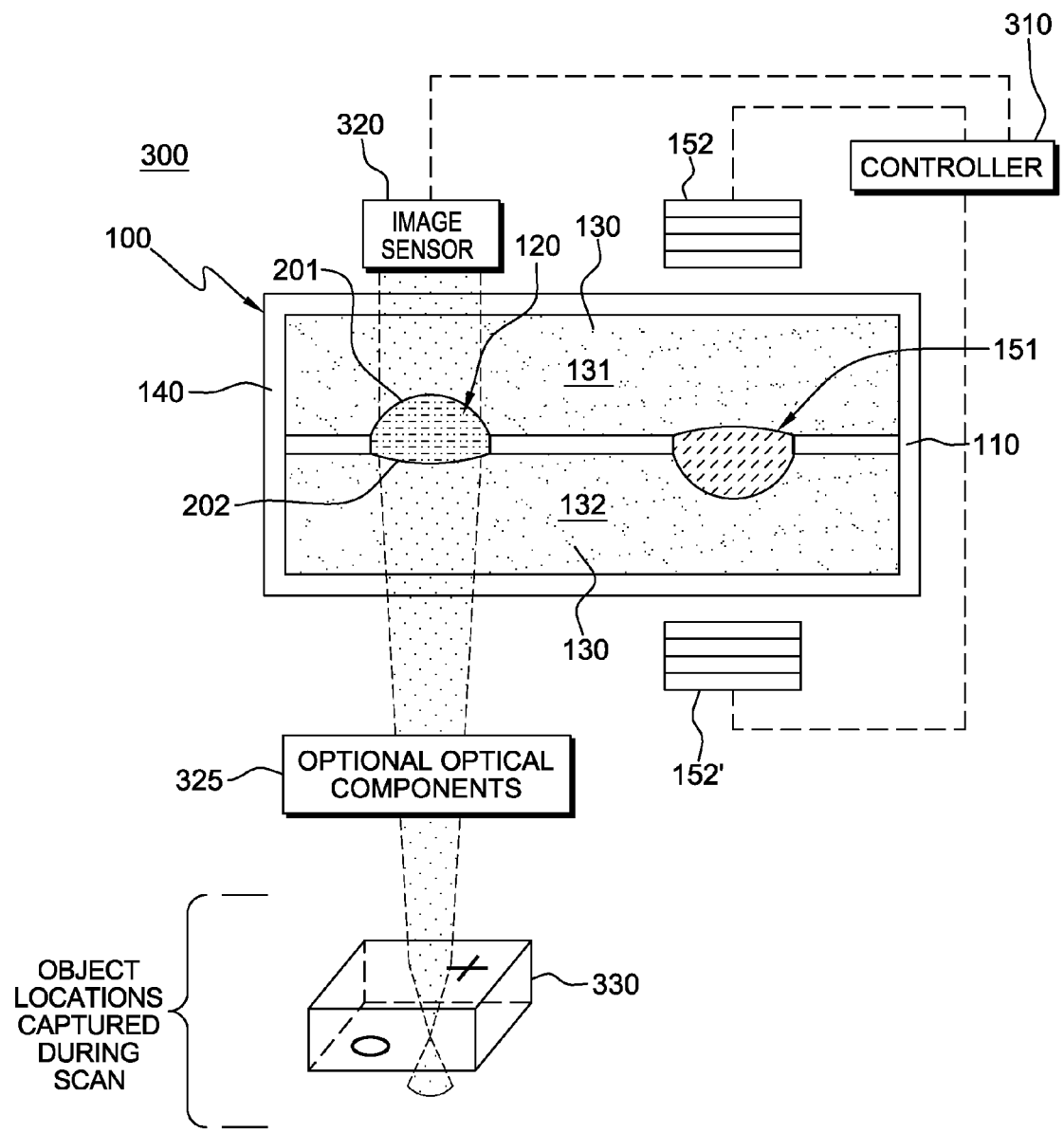
FIG. 3 is a schematic of one embodiment of an imaging system employing a reconfigurable liquid lens and illustrating imaging of an object in focus, in accordance with one or more aspects of the present invention.

FIG. 3 depicts one embodiment of an imaging system, generally denoted 300, employing a reconfigurable liquid lens structure 100, such as described above in connection with FIGS. 1A-2B. As noted, liquid lens structure 100 includes a substrate 110 comprising at least one first channel through the substrate containing at least one liquid lens drop 120, which functions as the liquid lens, and at least one second channel containing at least one ferrofluid drop 151, which facilitates reconfiguring the liquid lens, as described herein. The liquid lens structure further includes an enclosure 140 defining a sealed chamber comprising a first chamber portion 131 and a second chamber portion 132 on opposite sides of the substrate, both of which are filled with a second liquid, such as water. The substrate is non-wetting and liquid drop 120 and ferrofluid drop 151 are pinned at the edges of their respective channels through substrate 110.

In the example of FIG. 3, imaging system 300 further includes a controller 310, comprising, for example, a general purpose computer controller 310, which is provided with (for example) logic to facilitate adjusting configuration of ferrofluid drop 151, and thus, configuration of liquid drop 120 of liquid lens structure 100, as well as to control the capture of one or more in-focus images via an image sensor 320. Note that in this example, two electromagnetic drives 152, 152' are employed in alignment above and below ferrofluid drop 151 to control the configuration of the ferrofluid drop by producing respective pull-forces on the coupled droplets of the ferrofluid drop, causing either the first (upper) side volume to become larger or the second (lower) side volume to become larger, as explained above. This in turn alters the protruding volume of the liquid lens drop within the first chamber portion 131 and second chamber portion 132. By so displacing the liquid lens drop 120, the radii of curvature of the coupled droplets of the liquid lens are manipulated, which in turn alters the focal distance of an object 330. By placing image sensor 320 on one side of the liquid lens, and optional optical components 325 on the other side, an object 330 at various distances can be focused upon.

Note that in the depicted example, image sensor 320 is disposed above enclosure 140, which in one embodiment, is a transparent housing, and is aligned with an image path passing through liquid lens drop 120, and in particular, through the first droplet portion 201 and second droplet portion 202 of liquid drop 120. In addition, the image path passes through enclosure 140, and (optional) optical components 325 (such as a large aperture lens), which may be employed with the non-oscillating liquid lens described herein. The resultant imaging system has a focal distance with a defined range, wherein objects located within that range may be captured by adjusting the liquid lens drop configuration. Note that the image sensor 320 may comprise any appropriate imaging device. In one example, the image sensor is part of a digital camera or video recorder.

Figure 4A:
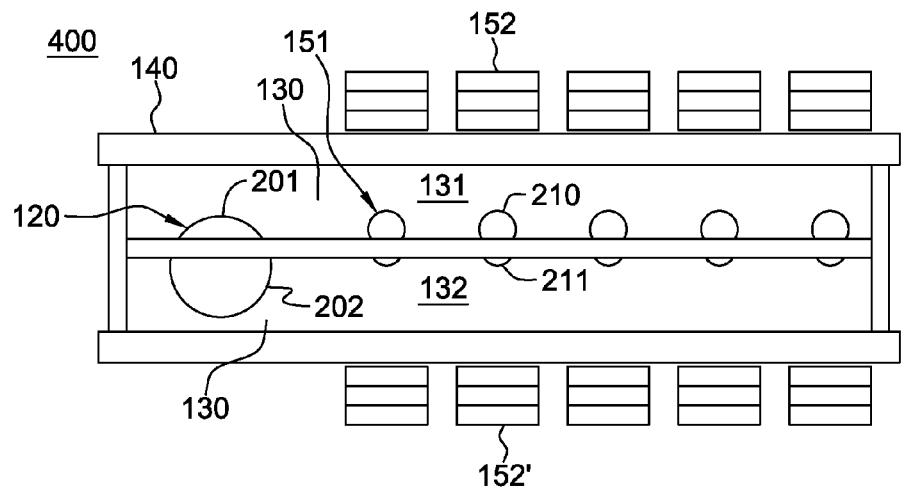
FIG. 4A is an elevational view of another embodiment of a reconfigurable liquid lens structure, in accordance with one or more aspects of the present invention.
Figure 4B:
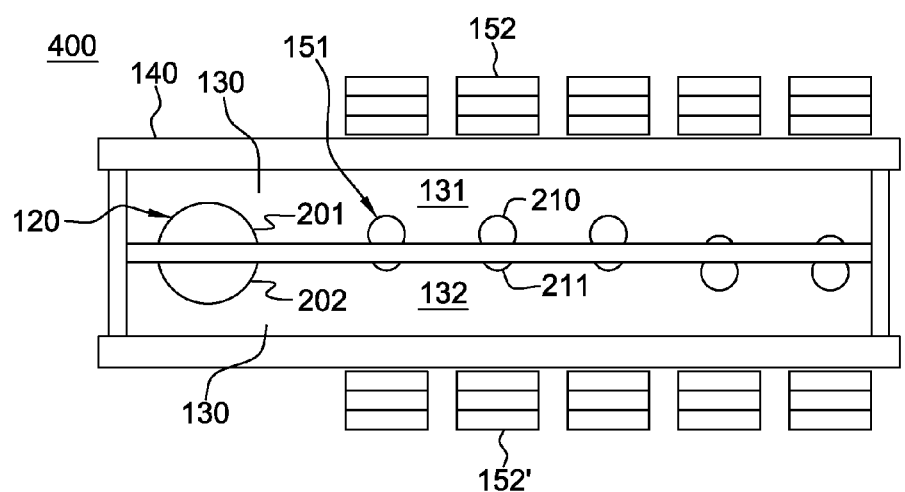
FIG. 4B is an elevational view of the reconfigurable liquid lens structure of FIG. 4A, shown with two of the five illustrated bi-stable capillary switching elements switched from the first (upper) chamber portion to the second (lower) chamber portion of the reconfigurable liquid lens, and illustrating the resultant reconfiguration of the liquid lens drop, in accordance with one or more aspects of the present invention.
Figure 4C:
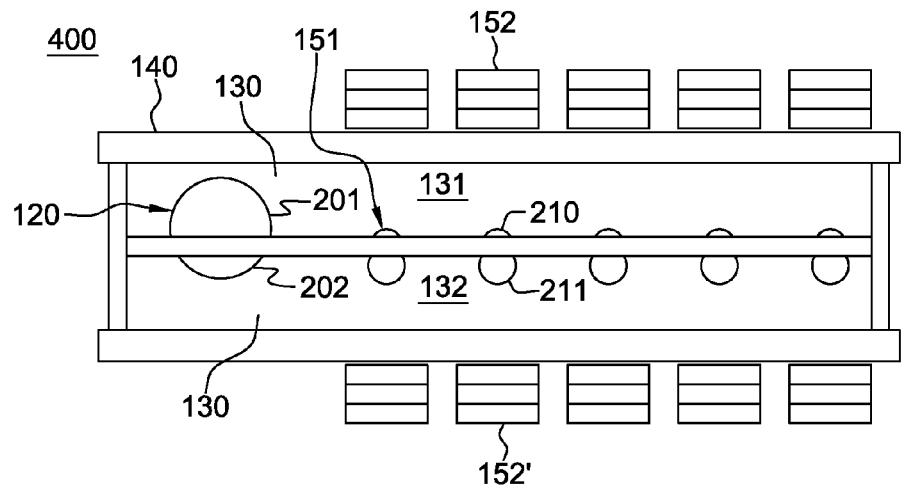
FIG. 4C is an elevational view of the reconfigurable liquid lens structure of FIGS. 4A & 4B, shown with the remaining bi-stable capillary switching elements switched to the second (lower) chamber portion of the reconfigurable liquid lens, and illustrating the resultant reconfiguration of the liquid lens drop, in accordance with one or more aspects of the present invention.

FIGS. 4A-4C depict an alternate embodiment of a non-oscillating liquid lens structure 400, which is similar to that described above in connection with FIGS. 1A-3, but with multiple ferrofluid drops 151, each configured with sufficient ferrofluid volume to function as a bi-stable capillary switch element. All illustrated, each ferrofluid drop 151 is driven, in this embodiment, by a respective electromagnet 152, 152' disposed above and below the ferrofluid drop. Each ferrofluid drop 151 is provided with a total volume greater than the critical volume in relation to the respective channel (or opening) within which the drop is held. This in turn means that each ferrofluid drop functions as a bi-stable capillary switch element, and may be switched between one of two states; that is, either an upper state or a lower state, wherein in the upper state, greater ferrofluid volume exists within the first chamber portion 131 of the liquid lens structure, and in the lower state, greater ferrofluid volume resides within the second chamber portion 132 of the liquid lens structure 400.

Movement of ferrofluid within the ferrofluid drops between the upper and lower states correspondingly affects and controls the proportion of the first fluid in the first and second droplet portions 201, 202 of liquid lens drop 120 above and below substrate 110. By selectively activating one or more ferrofluid drops to switch the ferrofluid drop from, for example, an upper state, such as illustrated in FIG. 4A, to a lower state, such as illustrated in FIG. 4C, reconfiguration of the liquid lens drop is achieved. This is due, in part, to the incompressible nature of the second fluid (e.g., water) contained within the chamber comprising upper chamber portion 131 and lower chamber portion 132. The electromagnets 152, 152' may be selectively energized (as explained above in connection with FIGS. 1A-3), to adjust configuration of the respective ferrofluid drop 151, or more particularly (in this example) to switch the ferrofluid drop between the upper and lower states. Note that if the ferrofluid volume is less than the critical volume, then the ferrofluid drop may be controlled in a manner similar to that described above in connection with FIGS. 1A-3, and rather than have a single ferrofluid drop, multiple ferrofluid drops and multiple electromagnetic drives would be provided. Providing ferrofluid drops with a volume sufficient to function as a bi-stable capillary switch element provides the further advantage of eliminating the need to maintain energizing of the respective electromagnetic drivers once the state is switched to achieve the desired configuration of the liquid lens drop.

As noted, FIG. 4A depicts all of the switching elements in the upper state, and in FIG. 4B, two of the switching elements have been switched down to the lower state (by activating the respective electromagnets 152'). In FIG. 4C, all of the switching elements have been toggled down (by energizing the respective electromagnets 152'). The result depicted in FIG. 4C is that a maximum volume of the first liquid of the liquid lens drop resides in first chamber portion 131 of the enclosure, and a minimum first liquid volume resides in second chamber portion 132, which provides the shortest focal distance of the lens.

Figure 5:
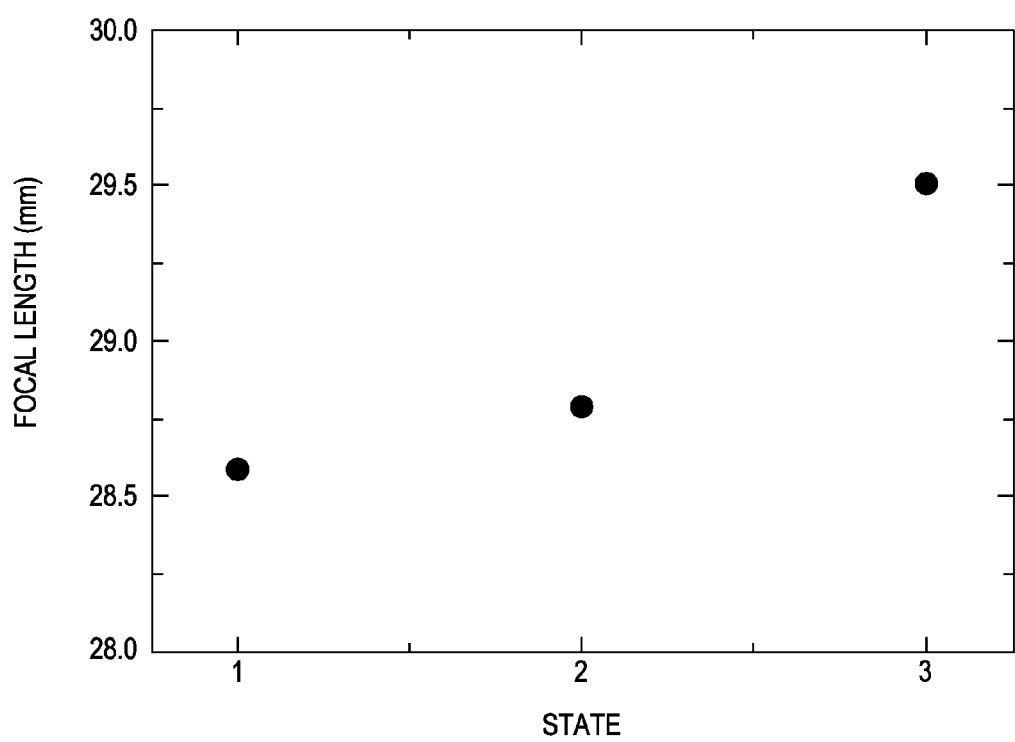
FIG. 5 graphically depicts a plot of different focal distances obtained, employing the reconfigurable liquid lens structure illustrated in FIGS. 4A-4C, responsive to toggling of different ones of the multiple bi-stable capillary switching elements of the reconfigurable liquid lens, in accordance with one or more aspects of the present invention.

FIG. 5 graphically depicts change in focal distance with reconfiguration of an otherwise static liquid lens, such as described above in connection with FIGS. 4A-4C. By toggling different combinations of bi-stable capillary switching elements, the liquid lens can be reconfigured for different static focal distances. By way of example, the states of FIG. 5 were obtained by toggling different numbers of 2.5 mm ferrofluid drops, with the states corresponding to 1, 3, and 5 liquid switching elements being toggled, respectively. The computed focal distance for each of the states is shown. Also, note that since the switches are bi-stable, once they have been toggled, no additional power to the electromagnets is necessary to maintain the new (equilibrium) states, making for an energy efficient adaptive liquid lens system. Applications for such an energy efficient, reconfigurable liquid lens may include medical imaging, multiple layer read/write technologies, 3-D lithography, etc.

Figure 6A:
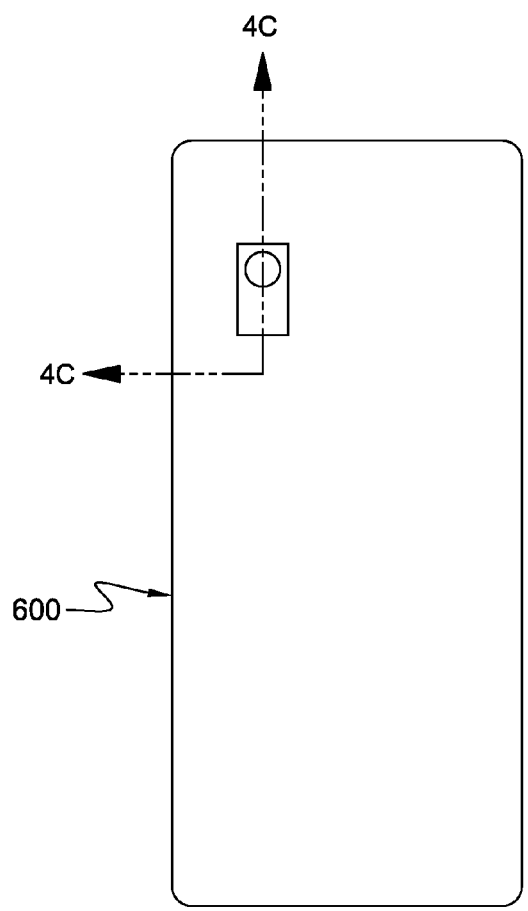
FIG. 6A depicts one embodiment of a packaged imaging system, such as a camera in a phone, comprising a reconfigurable liquid lens structure, in accordance with one or more aspects of the present invention.
Figure 6B:
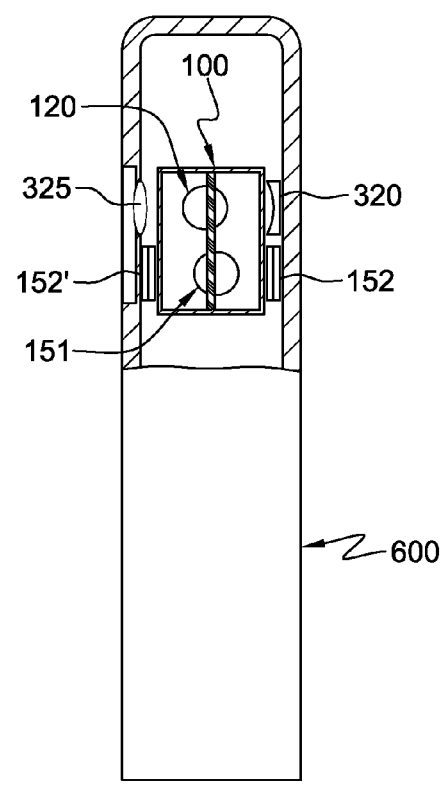
FIG. 6B depicts the packaged imaging system of FIG. 6A, taken along line 6B-6B thereof, and illustrating inclusion therein of one embodiment of an imaging system employing a reconfigurable liquid lens structure, in accordance with one or more aspects of the present invention.

FIGS. 6A & 6B partially depict the imaging system of FIG. 3, implemented within a packaged device such as, for example, a phone. As illustrated in the partial cross-sectional view of FIG. 6B, the reconfigurable liquid lens structure 100 may be placed, in one embodiment, between an image sensor 320 and optional optical components 325. Reconfiguration of the ferrofluid drop 151, and consequently the liquid lens drop 120, can be driven by a pair of electromagnetic drives 152, 152' (in one example), as explained above.

Figure 7A:
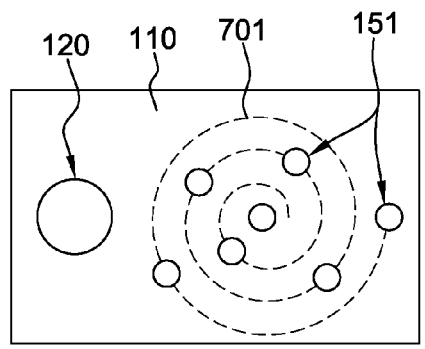
FIG. 7A is a partial plan view of another embodiment of a reconfigurable liquid lens structure, in accordance with one or more aspects of the present invention.
Figure 7B:
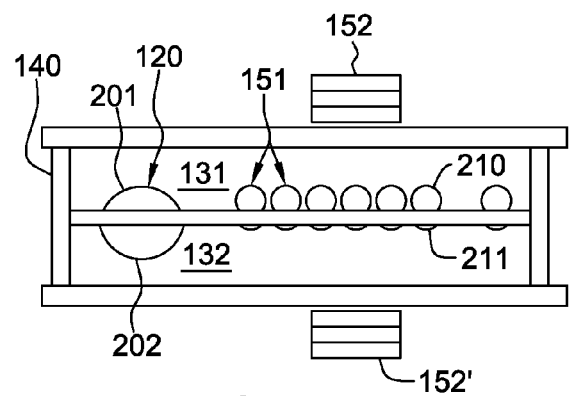
FIG. 7B is an elevational view of the reconfigurable liquid lens structure of FIG. 7A, in accordance with one or more aspects of the present invention.
Figure 7C:
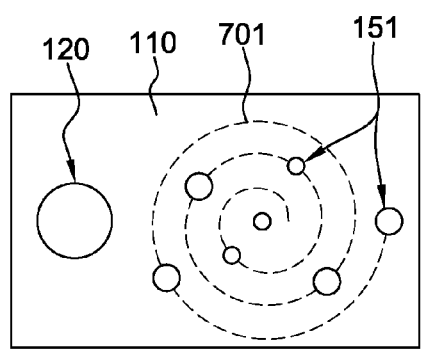
FIGS. 7C & 7D depict the reconfigurable liquid lens structure of FIGS. 7A & 7B, with the liquid of three of the illustrated bi-stable capillary switching elements shown transitioned from the first (upper) chamber portion to the second (lower) chamber portion, with the resultant reconfiguration of the liquid lens drop illustrated in FIG. 7D, in accordance with one or more aspects of the present invention.
Figure 7D:
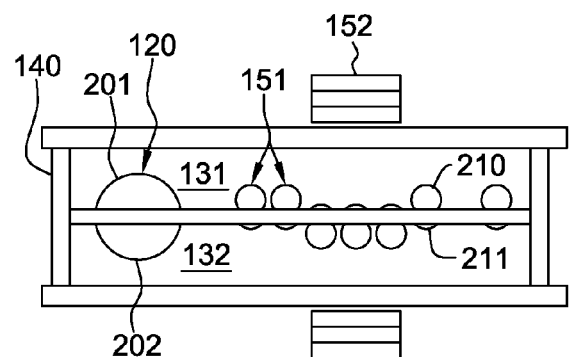
Figure 7E:
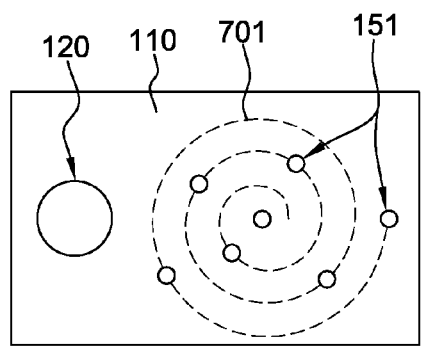
FIGS. 7E & 7F depict the reconfigurable liquid lens structure of FIGS. 7C & 7D, with liquid of the remaining bi-stable capillary switching elements shown transitioned from the first chamber portion to the second chamber portion, and with the resultant reconfiguration of the liquid lens drop illustrated in FIG. 7F, in accordance with one or more aspects of the present invention.
Figure 7F:
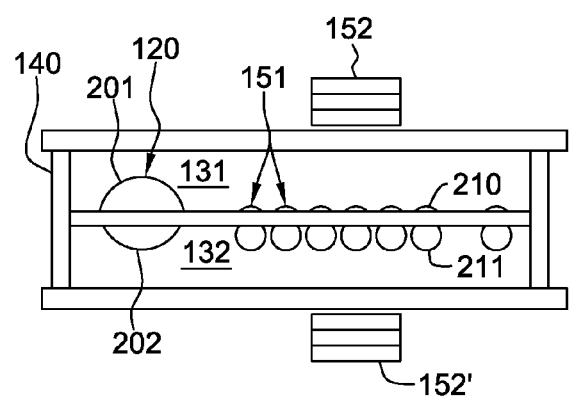

As described above, in the embodiment of FIGS. 6A & 6B, electromagnets 152, 152' may be used to control the position of the ferrofluid drop(s) (i.e., the ferrofluid drive within the sealed chamber comprising the liquid lens drop) by producing a pull-force on the respective coupled ferrofluid droplets causing either the first chamber volume to become larger, or the second chamber volume to become larger. This in turn alters the protruding volume of the liquid lens drop, by having a larger volume in the second chamber portion 132 or first chamber portion 131, respectively. By so displacing the liquid lens drop, the radius of curvature of the lens is manipulated, which in turn alters the focal distance of an object. Thus, by placing the image sensor on one side of the liquid lens, and optional optical components on the other side, objects at various distances can be focused upon. Also, note that by employing an array of bi-stable capillary switching elements (each with a volume larger than the respective critical volume), reconfigurability can be achieved with no additional power being needed by the electromagnet after a switch has been toggled. With sub-critical ferrofluid drop volumes, maintaining asymmetrical shapes requires maintaining energizing of at least one of the two opposing electromagnets By way of further example, FIGS. 7A-7F illustrate one embodiment of another reconfigurable liquid lens structure, as well as the toggling of the illustrated bi-stable ferrofluid switch elements. In this embodiment, multiple ferrofluid drops 151 are employed, each with a ferrofluid volume sufficient to function as a bi-stable capillary switch element. Each ferrofluid drop 151 comprises a pair of coupled ferrofluid droplets in a respective second channel. In this embodiment, a single pair of electromagnets 152, 152' is employed, along with strategic placement of the ferrofluid drops 151, such as in a spiral 701 configuration outward from the center axis of the aligned electromagnetic drives 152, 152'. In the operational example depicted in FIGS. 7A & 7B, the switch elements are all set to the upper state, meaning that the volume of the first liquid in the second droplet portion 202 of liquid lens drop 120 is at a maximum. As the lower electromagnet 152' is energized, the switch elements closest in distance to the center axis of the aligned electromagnets 152, 152' will initially switch to the lower state, as illustrated in FIGS. 7C & 7D, wherein a greater volume of ferrofluid is disposed in the second droplet portion 211, than in the first droplet portion 210. As the power to electromagnet 152' continues to increase (and no power is needed for electromagnet 152), all ferrofluid drops are toggled to the lower state, as illustrated in FIGS. 7E & 7F. Advantageously, after one or more of the ferrofluid drops are toggled, the electromagnetic drivers 152 may be de-energized, and the liquid lens drop will retain the desired shape, due to the bi-stable nature of the ferrofluid drops described in this embodiment.

Figure 8A:
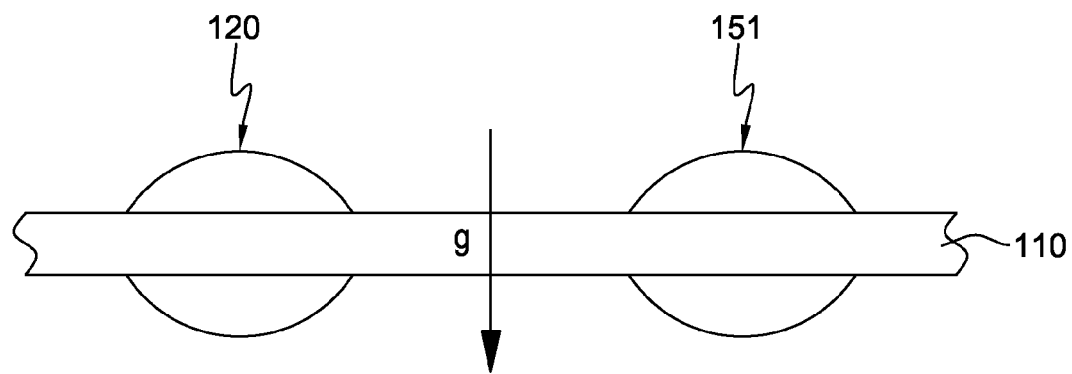
FIG. 8A is a partial depiction of a reconfigurable liquid lens structure, with direction of gravity vector (g) shown as top-to-bottom, in accordance with one or more aspects of the present invention.
Figure 8B:
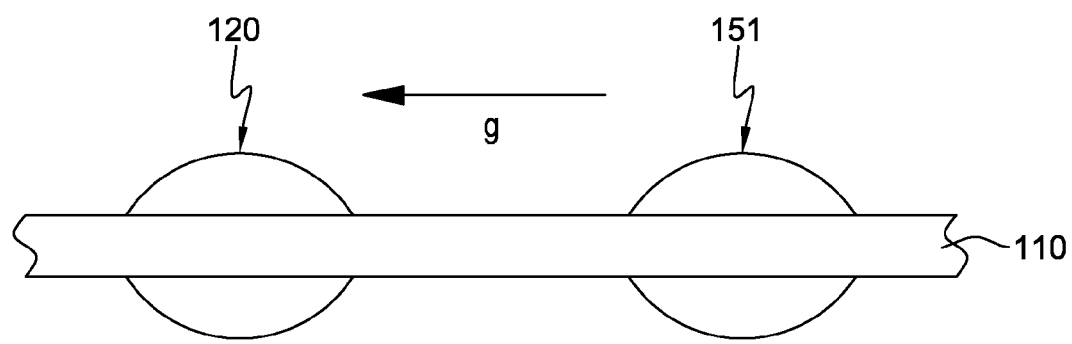
FIG. 8B is a partial depiction of the reconfigurable liquid lens of FIG. 8A turned with direction of gravity (g) shown as right-to-left, in accordance with one or more aspects of the present invention.

FIGS. 8A & 8B depict invariance of the reconfigurable liquid lens with different gravitational orientations. In FIG. 8A, the liquid lens structure is shown with the optical axis parallel to the direction of gravity vector (g), and FIG. 8B illustrates the liquid lens structure with the optical axis oriented perpendicular to the gravity vector (g). By keeping the gravitational bond number $B_0 < 1$, surface tension forces will dominate over gravitational body forces. Thus, the droplets can be made to retain their spherical shapes, regardless of the direction of gravity. In FIGS. 8A & 8B, one embodiment of the liquid-liquid lens system described herein is partially illustrated, including substrate 110 with the liquid lens drop 120 (functioning as the liquid lens) and ferrofluid drop 151 (functioning as the actuation driver). As explained above, both drops comprise coupled droplets with first and second droplet portions respectively extending above and below the first and second main surfaces of substrate 110. With this configuration, the measured maximum departure from a uniform (spherical) radius of curvature for both cases illustrated in FIGS. 8A & 8B is less than 1%. Invariance to gravitational orientation can be further enhanced by density-matching the fluids employed in the liquid-liquid lens system.

Figure 9:
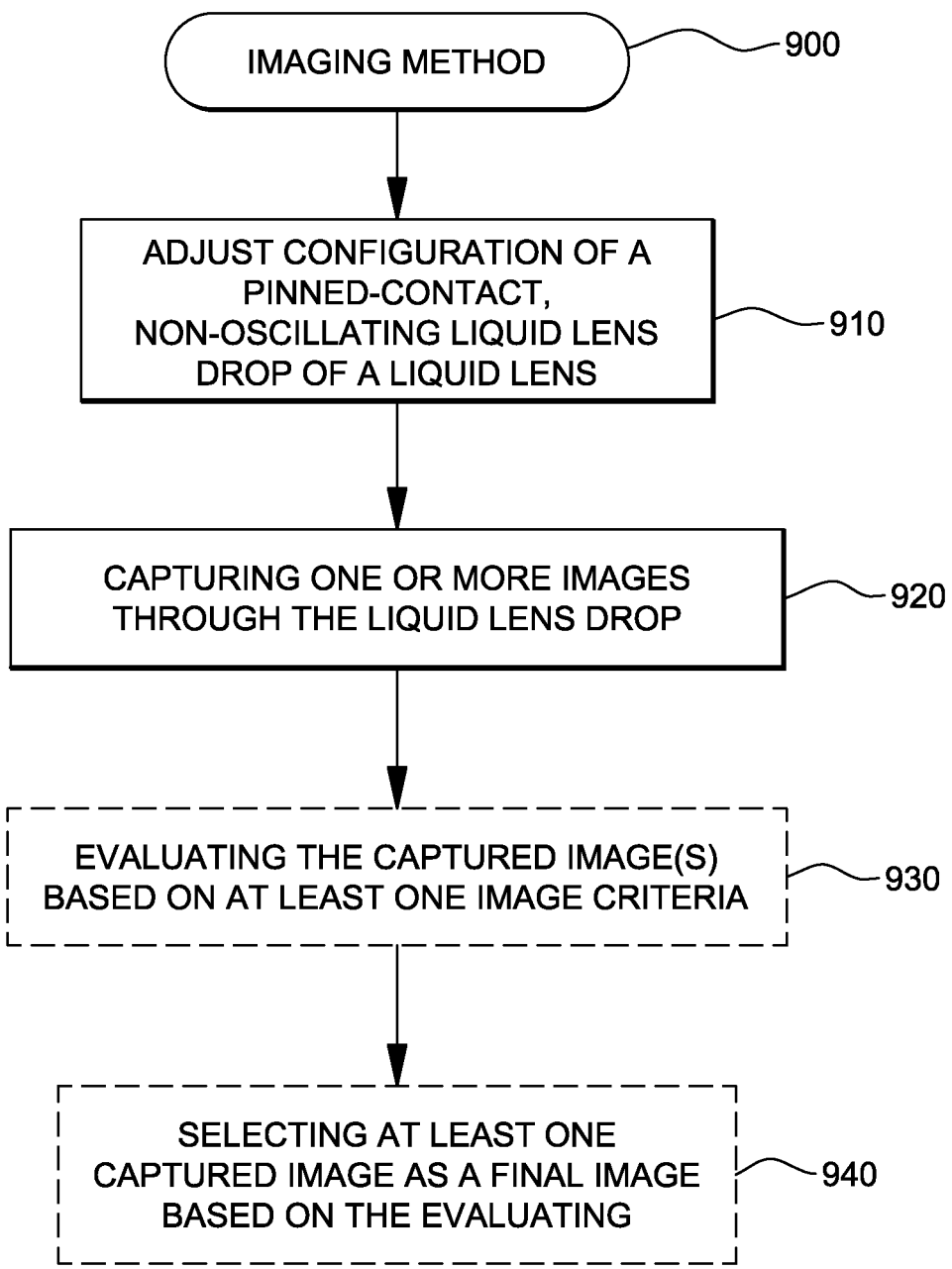
FIG. 9 is a flowchart of one embodiment of an imaging method employing a reconfigurable liquid lens, in accordance with one or more aspects of the present invention.

FIG. 9 illustrates one embodiment of an imaging method employing an oscillating liquid lens, such as described herein. The imaging method 900 includes adjusting configuration of a pinned-contact liquid lens drop of a liquid-liquid lens such as described herein 910, and capturing one or more images through the liquid lens drop 920. Specifically, the one or more images are captured through the first droplet portion and second droplet portion of the lens drop, which extend above the first and second surfaces, respectively, of the substrate comprising the channel within which the liquid lens drop is held. The captured images may optionally be forwarded to a controller, which comprises (in one embodiment) a computer that includes logic to evaluate 930 the captured images based on one or more image criteria, such as sharpness of the image. Evaluation of digital images can be readily accomplished by one skilled in the art using, in part, existing image analysis software. One or more captured image(s) may then be selected as one or more final image(s) based on the evaluating 940. Depending upon the implementation, the final images may be combined.

Those skilled in the art will note that the pinned-contact, reconfigurable liquid-liquid lens described herein presents a novel solution for imaging systems where changes in focal distance are sought. The liquid lens can be manufactured in a small and lightweight package, with a non-invasive, actuation approach, as described herein. Advantageously, relatively small voltage levels can be employed in the reconfiguration mechanism, making application of the liquid lens practical.

Disclosed herein is a liquid lens with an adaptable focal distance that, through reconfiguration, can capture any image plane in a given range. The lens features two droplet portions coupled through a cylindrical channel (or hole), with pinned-contact lines residing against a non-wetting substrate. An incompressible second liquid surrounds the liquid lens in a closed chamber. A non-invasive electromagnetic drive is employed (in one embodiment) to adjust coupled ferrofluid droplets in a second cylindrical channel (or hole) in the substrate. Adjusting of the ferrofluid droplets results in corresponding reconfiguration of the liquid lens droplets via the incompressible surrounding liquid. The change in the curvature of the droplet portions induces a change in focal distances. The liquid lens presented is a coupled-droplet system, which can be reconfigured with very little input.

Advantageously, a centimeter-scaled aperture may be obtained using the liquid lens structure disclosed herein. At a scale that is small enough so that gravity is not dominant, the coupled droplet liquid lens (with pinned-contact lines) balances fluid inertia against surface tension. Experimental results have illustrated that millimeter-scale liquid lenses, and even centimeter-scaled lenses, are practical.

The large aperture, adaptive liquid-liquid lens disclosed herein offers unique advantages and capabilities over existing approaches. Increased light gathering is possible with centimeter-scale aperture lenses (e.g., a 30-fold increase in light gathering capability going from a 1.68 mm diameter liquid lens in air to a 10 mm diameter liquid-liquid lens). Light gathering is further enhanced by reconfigurability without oscillations, as compared to oscillatory-driven liquid lenses. Energy efficiency is retained, while long-term stability issues (e.g., due to evaporation) which have traditionally plagued previous liquid lens designs, have been eliminated, all in a design that is nearly invariant with gravitational orientation.

Those skilled in the art will note that the coupled-droplet system presented herein can be applied in a number of applications, including mobile phones, video recorders, and other small, lightweight consumer products with video recording capabilities. Other applications include high-speed adaptive imaging, camcorders, and other 3-D image reconstruction by arrays of lenses and reconfigurability for less demanding applications, with an emphasis on energy consumption. For example, other applications include autonomous, micro-air-vehicles for surveillance and defense, which would benefit from imaging capabilities in many directions rather than just vision straight ahead (or below). The relatively small size and high energy efficiency of the liquid-liquid lens presented suits the installation of several of these lenses in such a small vehicle to realize imaging in all directions with rapid focusing capabilities.

As will be appreciated by one skilled in the art, aspects of the controller described above may be embodied as a system, method or computer program product. Accordingly, aspects of the controller may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the controller may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages.

Aspects of the present invention are described above with reference to flowchart illustrations and/or block diagrams of methods, apparatus (systems) and computer program products according to embodiments of the invention. It will be understood that certain blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, certain blocks in the flowcharts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that certain blocks of the block diagram and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

What is claimed is:

1. A non-oscillating liquid lens comprising:
a substrate comprising at least one channel extending through the substrate between a first surface and a second surface of the substrate;
a liquid lens drop comprising a first liquid, the liquid lens drop being held within one channel of the at least one channel extending through the substrate, the liquid lens drop comprising a first droplet portion with a first capillary surface protruding away from the first surface of the substrate, and a second droplet portion with a second capillary surface protruding away from the second surface of the substrate, the first droplet portion and the second droplet portion being connected through the one channel;
an enclosure at least partially surrounding the substrate and comprising a chamber, the one channel of the at least one channel extending through the substrate residing within the chamber of the enclosure;
a second liquid disposed within the chamber, the second liquid and the liquid lens drop comprising the first liquid being in one of direct or indirect contact within the chamber; and
an actuator which facilitates adjusting configuration of the liquid lens drop in a non-oscillating manner within the one channel within the chamber, wherein adjusting configuration of the liquid lens drop adjusts a focal distance of the liquid lens.

2. The non-oscillating liquid lens of claim 1, wherein the actuator is operatively coupled to the liquid lens drop within the one channel via the second liquid disposed within the chamber of the enclosure.

3. The non-oscillating liquid lens of claim 1, wherein the actuator further facilitates maintaining the liquid lens drop in a selected asymmetrical configuration.

4. The non-oscillating liquid lens of claim 1, wherein the first surface of the substrate facilitates defining a first chamber portion of the chamber and the second surface of the substrate facilitates defining a second chamber portion of the chamber, and wherein the second liquid substantially fills the first chamber portion and the second chamber portion.

5. The non-oscillating liquid lens of claim 4, wherein the second liquid and the liquid lens drop comprising the first liquid are immiscible and are in direct contact within the first chamber portion and are in direct contact within the second chamber portion.

6. The non-oscillating liquid lens of claim 4, wherein the one channel extending through the substrate is a first channel extending through the substrate, and wherein at least one second channel extends through the substrate, and the driver comprises:
at least one ferrofluid drop held in and protruding from the at least one second channel extending through the substrate between the first surface and the second surface of the substrate, the at least one ferrofluid drop displacing the liquid lens drop within the first and second chamber portions of the chamber as ferrofluid of the at least one ferrofluid drop is adjusted between the first and second chamber portions of the chamber; and
at least one electromagnet for moving ferrofluid of the at least ferrofluid drop held within the at least one second channel between the first chamber portion and the second chamber portion, and thus, for adjusting configuration of the liquid lens drop held within the first channel within the chamber, thereby adjusting the focal distance of the liquid lens.

7. The non-oscillating liquid lens of claim 6, wherein the actuator further comprises multiple electromagnets for moving ferrofluid of the at least one ferrofluid drop held within the at least one second channel in a selected configuration between the first and second chamber portions of the chamber, and thus maintaining the liquid lens drop in the selected configuration.

8. The non-oscillating liquid lens of claim 6, wherein the driver further comprises multiple ferrofluid drops held in multiple second channels extending through the substrate between the first surface and the second surface of the substrate, each ferrofluid drop comprising a volume greater than a critical volume defined relative to a diameter of the respective second channel of the multiple second channels and functioning as a bi-sable capillary switching element, and wherein each bi-stable capillary switching element can be toggled between a first state where the ferrofluid drop resides principally in the first chamber portion and a second state where the ferrofluid drop resides principally in the second chamber portion, and wherein one ferrofluid drop of the multiple ferrofluid drops is separately switchable from another ferrofluid drop of the multiple ferrofluid drops to facilitate tuning of the focal distance of the liquid lens.

9. The non-oscillating liquid lens of claim 1, wherein the actuator further comprises at least one bi-stable capillary switch element disposed within the chamber and operatively coupled to the liquid lens drop via the second liquid disposed within the chamber.

10. The non-oscillating liquid lens of claim 1, wherein the first liquid comprises a high index of refraction liquid, and the second liquid comprises water.

11. The non-oscillating liquid lens of claim 1, wherein the first liquid, the second liquid, and the substrate are chosen to facilitate the liquid drop remaining pinned at an edge of the substrate at the one channel.

12. The non-oscillating liquid lens of claim 1, wherein the enclosure comprises a transparent housing portion disposed over at least the first droplet portion or the second droplet portion of the liquid lens drop, and wherein the chamber is a sealed chamber.

13. An imaging system comprising:
 a non-oscillating liquid lens comprising:
  a substrate comprising at least one channel extending through the substrate between a first surface and a second surface of the substrate;
  a liquid lens drop comprising a first liquid, the liquid lens drop at least partially hold one channel of the at least one channel extending through the substrate, the liquid lens drop comprising a first droplet portion with a first capillary surface protruding away from the first surface of the substrate, and a second droplet portion with a second capillary surface protruding away from the second surface of the substrate, the first droplet portion and the second droplet portion being connected through the one channel;
  an enclosure at least partially surrounding the substrate and comprising a chamber, the one channel of the at least one channel extending through the substrate residing within the chamber of the enclosure;
  a second liquid disposed within the chamber, the second liquid and the liquid lens drop comprising the first liquid being in one of direct or indirect contact within the chamber; and
  an actuator which facilitates adjusting configuration of the liquid lens drop in a non-oscillating manner within one channel within the chamber, wherein adjusting configuration of the liquid lens drop adjusts a focal distance of the liquid lens; and
 at least one imaging sensor coupled to at least one imaging path passing through the first and second droplet portions of the liquid lens drop in the one channel for capturing an image through the first and second droplet portions of the liquid lens drop.

14. The imaging system of claim 13, wherein the actuator is operatively coupled to the liquid lens drop held within the one channel via the second liquid disposed within the chamber of the enclosure.

15. The imaging system of claim 13, wherein the actuator further facilitates maintaining the liquid lens drop in a selected asymmetrical configuration.

16. The imaging system of claim 13, wherein the first surface of the substrate facilitates defining a first chamber portion of the chamber and the second surface of the substrate facilitates defining a second chamber portion of the chamber, and wherein the second liquid substantially fills the first chamber portion and the second chamber portion.

17. The imaging system of claim 16, wherein the second liquid and the liquid lens drop comprising the first liquid are immiscible and are in direct contact within the first chamber portion and are in direct contact within the second chamber portion.

18. The imaging system of claim 16, wherein the one channel extending through the substrate is a first channel extending through the substrate, and wherein at least one second channel extends through the substrate, and the driver comprises:
 at least one ferrofluid drop held in and protruding from the at least one second channel extending through the substrate between the first surface and the second surface of the substrate, the at least one ferrofluid drop displacing the liquid lens drop within the first and second chamber portions of the chamber as ferrofluid of the at least one ferrofluid drop is adjusted between the first and second chamber portions of the chamber; and
 at least one electromagnet for moving ferrofluid of the at least ferrofluid drop held within the at least one second channel between the first chamber portion and the second chamber portion, and thus, for adjusting configuration of the liquid lens drop held within the first channel within the chamber, thereby adjusting the focal distance of the liquid lens.

19. The imaging system of claim 13, wherein the actuator further comprises at least one bi-stable capillary switch element disposed within the chamber and operatively coupled to the liquid lens drop via the second liquid disposed within the chamber.

20. The imaging system of claim 13, wherein the enclosure comprises a transparent housing portion disposed over at least one of the first droplet portion or the second droplet portion of the liquid lens drop, and wherein the chamber is a sealed chamber.

21. An imaging method comprising:
 adjusting configuration of a non-oscillating liquid lens drop of a liquid lens, the liquid lens comprising a substrate defining a channel extending between a first surface and a second surface thereof, with the liquid lens drop being at least partially held within the channel, the liquid lens drop comprising a first droplet portion including a first capillary surface protruding away from the first surface of the substrate and a second droplet portion comprising a second capillary surface protruding away from the second surface of the substrate, wherein the first and second droplet portions of the liquid lens drop are connected through the channel, the liquid lens further comprising an enclosure at least partially surrounding the substrate and comprising a chamber, the one channel residing within the chamber and the chamber comprising a second liquid, the second liquid and the liquid lens drop comprising the first liquid being in one of direct or indirect contact within the chamber, and wherein the adjusting comprises applying a force to at least one of the first droplet portion or the second droplet portion in a non-oscillating manner to reconfigure the liquid lens drop within the channel, and thereby adjust a focal distance of the liquid lens; and capturing at least one image via an image path passing through at least one of the first or second droplet portions of the liquid lens drop.

22. The imaging method of claim 21, wherein the adjusting comprises applying the force to the at least one of the first droplet portion or the second droplet portion via the second liquid disposed within the chamber of the enclosure, wherein the second liquid and the liquid lens drop comprising the first liquid are immiscible and are in direct contact within the chamber.

23. A method of fabricating a liquid lens comprising:

obtaining a substrate, the substrate being non-wetting relative to a liquid lens drop;

providing at least one channel in the substrate extending from a first surface to a second surface thereof;

providing the liquid lens drop comprising a first liquid within one channel of the at least one channel extending through the substrate, the liquid lens drop comprising a first droplet portion with a first capillary surface protruding away from the first surface of the substrate and a second droplet portion with a second capillary surface protruding away from the second surface of the substrate, the first droplet portion and the second droplet portion being connected through the one channel;

providing an enclosure comprising a chamber enclosing the one channel extending through the substrate, the first surface of the substrate facilitating defining a first chamber portion of the chamber, and the second surface of the substrate facilitating defining a second chamber portion of the chamber, wherein he first droplet portion resides within the first chamber portion of the chamber and the second droplet portion resides within the second chamber portion of the chamber;

disposing a second liquid within the first chamber portion and the second chamber portion of the chamber, the second liquid and the liquid lens drop being in one of direct or indirect contact within the chamber; and providing an actuator operatively coupled to at least one of the first droplet portion or the second droplet portion of the liquid lens drop for adjusting configuration of the liquid lens drop in a non-oscillating manner, wherein adjusting configuration of the liquid lens drop adjusts a focal distance of the liquid lens.

24. The method of claim 23, wherein the second liquid and the liquid drop comprising the first liquid are in direct contact and are immiscible, and the one channel extending through the substrate is a first channel extending through the substrate, and wherein the first surface of the substrate facilitates defining a first chamber portion of the chamber, and the second surface of the substrate facilitates defining a second chamber portion of the chamber, the second liquid substantially filling the first chamber portion and the second chamber portion, and wherein providing the actuator comprises:

providing at least one ferrofluid drop held in and protruding from at least one second channel extending through the substrate between the first surface and the second surface of the substrate, the at least one ferrofluid drop displacing the liquid lens drop within the first and second chamber portions of the chamber as the at least one ferrofluid drop is adjusted between the first and second chamber portions of the chamber; and providing an electromagnet for adjusting the at least one ferrofluid drop within the at least one second channel, thereby reconfiguring the liquid lens drop within the first channel.

* * * * *